Sept. 23, 1941.    M. J. JOHNSON    2,256,760
CONTROL SYSTEM
Filed Feb. 1, 1938    2 Sheets-Sheet 1
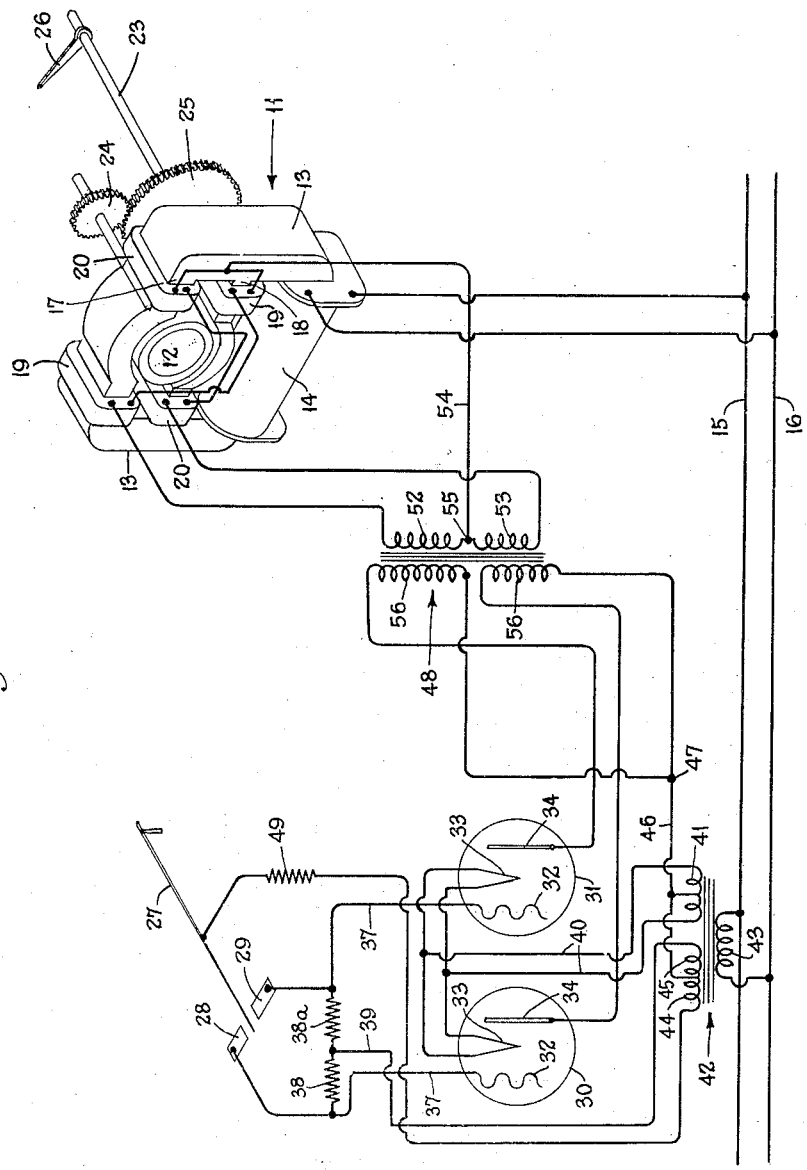
Fig. 1
INVENTOR
Manfred J. Johnson,
BY
ATTORNEY

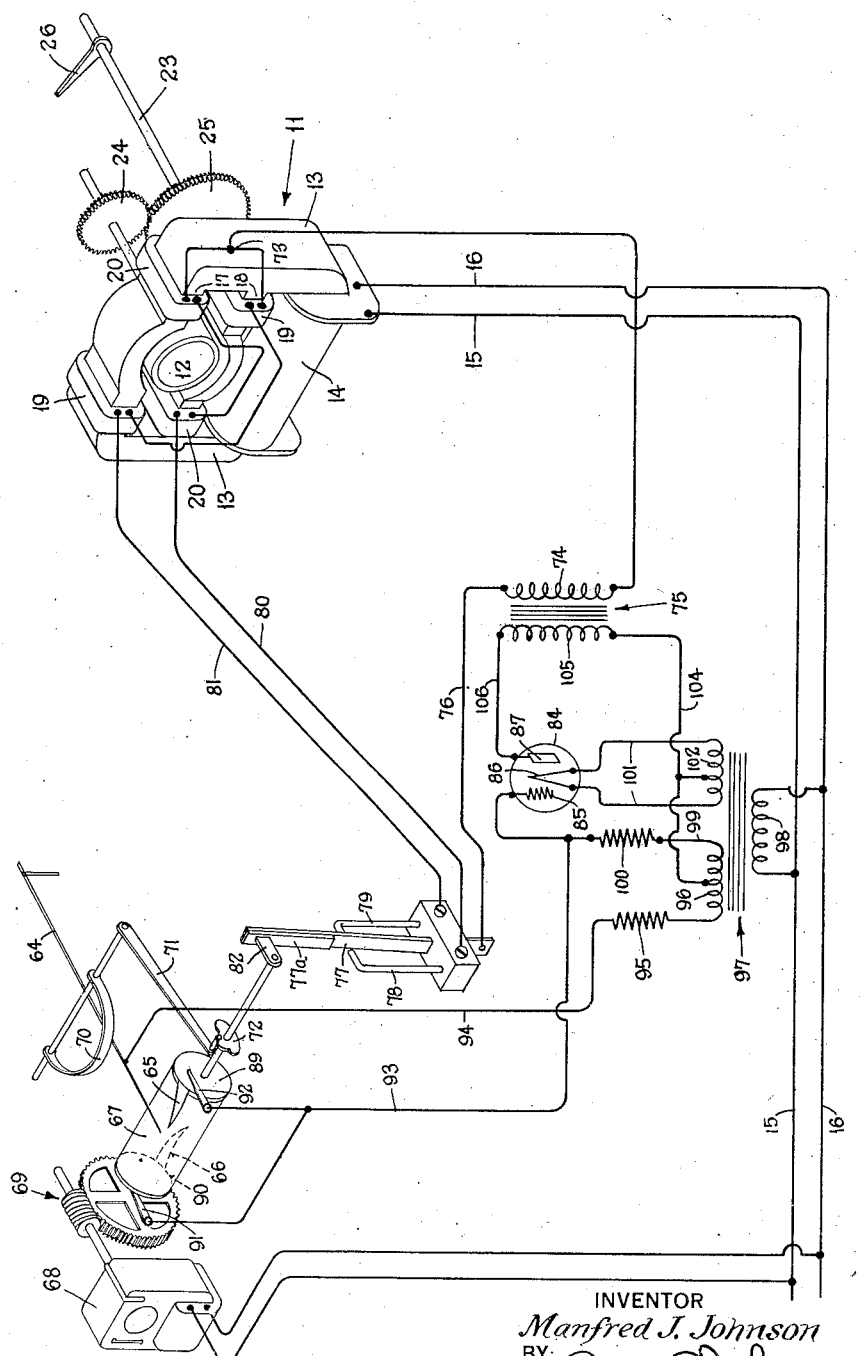

Patented Sept. 23, 1941

2,256,760

UNITED STATES PATENT OFFICE 2,256,760

CONTROL SYSTEM

Manfred J. Johnson, Naugatuck, Conn., assignor of one-half to The Lewis Engineering Company, Naugatuck, Conn.

Application February 1, 1938, Serial No. 188,042

15 Claims. (Cl. 172—278)

The present invention relates to control and/or indicating systems, and more particularly to control and/or indicating systems for compensating for and/or indicating changes in a condition.

In many devices, it is desired, during normal operation, to maintain a desired condition. In order to do this, it is necessary to have a control and/or indicating system which, when actuated, will compensate for and/or indicate variations from the normal condition. To be successful, such systems must be flexible, efficient and quick acting so as to be sensitive to the variety of changes in condition which are desired to be corrected and/or indicated.

Another requirement is that the control system must be accurate in its operation so that in correcting for the change in condition it will not overrun or move past the corrected position and thus set up a period of hunting during which the device will operate first to one side and then to the other side of the normal condition until the normal condition is gradually reached.

The present invention relates broadly to a control and/or indicating system and is a continuation in part of my copending applications, Serial No. 35,151, filed August 7, 1935, now Patent No. 2,109,776, issued March 1, 1938, and Serial No. 106,085, filed Oct. 17, 1936, having a reversible motor provided with inherent braking means and having its rotation controlled by means of an actuator through the medium of electron tubes. This system of control uses small currents, prevents sparking and is quickly responsive to changes. The controller can be manually actuated but preferably is connected to a means adapted to be operated in response to a change in condition to be corrected and/or indicated. When connected to the device to be controlled, the system will accurately compensate for and/or indicate changes from the normal condition and will quickly regulate the device in accordance with the direction and magnitude of the variation from the normal condition without overrunning or hunting so that the highest degree of accuracy is obtained.

According to the present invention, a reversible A. C. motor having opposed wire-wound shading coils is used to actuate the controller mechanism for the device to be controlled. The motor has a pair of wire-wound shading coils normally balanced so that it is in effect braked against rotation. The shading coils are connected to be controlled by electron tube means in accordance with the direction and magnitude of the changed condition.

In one form of the invention, a pair of electron tubes are connected, one to each shading coil, so as to have their plates energized therefrom and the control for the flow of electrons is actuated by the actuator for the controlling device. When a change in condition occurs in the device to be controlled, the actuator will move and through connected circuits control the flow of electrons in one or the other of the electron tubes in accordance with the direction and magnitude of the changed condition so that the associated shading coil becomes loaded and causes the controlling motor to operate in the desired direction to thereby actuate the controlling mechanism of the device to be controlled to correct and/or indicate the changed condition. When the condition is corrected, the loading will be removed from the shading coils and the motor will again become balanced and immediately operate to brake any further movement of the controller.

In another form of the invention, the reversible motor has the shading coils normally balanced and a switching means is provided for alternately coupling one or the other of the shading coils to a single electron tube. The tube is connected to a pair of spaced contacts and its operation is controlled by an actuator which moves in response to a change of condition in the machine to be controlled. The spaced contacts and switching means operate in timed relation so that changes in direction and magnitude of the condition will cause the actuator to close a circuit through the contact and synchronously therewith the switching means will couple the shading coil corresponding to such contact with the electron tube and thus load the corresponding shading coil to cause the controlling motor to operate in predetermined direction to correct for the changed condition.

The control and/or indicating system of the present invention obviously can be used in such a manner that it will control a device so as to compensate for changes in condition and can, at the same time, indicate the extent of such change or it can be operated to indicate the change in condition whereby it can be otherwise corrected as desired.

Other features and advantages of the invention will be apparent from the specification and claims when taken in connection with the drawings, in which:

Figure 1 is a diagrammatic view showing the system of this invention and the apparatus embodied therein.

Fig. 2 shows another form of system of this invention and apparatus embodied therein.

According to the present invention, a reversible motor 11 is provided for operating the control and/or indicating mechanism. This motor can be of any desired type which can be accurately controlled in extent and direction of operation. In the herein disclosed form of the invention, the motor used is an alternating current motor having a rotor 12 associated with a pair of field pieces 13 which are constantly energized by winding 14 connected to the wires 15 and 16 of a source of alternating current. The rotor in the preferred form of the invention is a squirrel-cage type, but any type of A. C. rotor can be used.

In order to control the operation of the motor as to starting and stopping and as to direction of rotation of the rotor, a pair of pole pieces 17 and 18 are positioned adjacent the rotor and are provided with a pair of normally opposed shading coils 19 and 20. As shown in Fig. 1, the two shading coils 19 and the two coils 20 are each suitably interconnected for simultaneous operation as a pair. It will be understood that when the windings of the shading coils 19 are short-circuited, the rotor will turn in one direction, and when the windings of the shading coils 20 alone are short-circuited, the rotor will turn in the opposite direction, and that turning will continue only so long as one pair of the shading coils are actually or in effect short-circuited or loaded. Immediately upon opening of one pair of short-circuited shading coils, the rotor will be brought to an abrupt stop, due to opposition of the shading coils 19 and 20. These characteristics of this type of motor are advantageous to produce the desired directional adjustments of the controllers. It is found that, by having the field pieces of the motor constantly energized, the response of the motor is almost instantaneous, and it quickly accelerates and yet stops quickly and suddenly upon the opening of the short-circuited shading coils due to the mutual opposition of the shading coils 19 and 20.

With this type of control, I am able to bring the controller to the desired position without the danger of overthrow which would result in hunting, and thus reduces substantially the time necessary for effecting a desired control.

The motor can be connected to a controller and/or indicator as by a control shaft 23, in any desired manner. In order to obtain a desired operating speed for the shaft 23, a gear 24 is mounted on the motor shaft in mesh with a gear 25 on the control shaft so that rotation in either direction of the motor will operate the control shaft 23 in either direction, which will in turn operate the mechanism to control the device as desired. The shaft 23 can carry an indicating pointer 26.

The means for controlling the motor as desired, comprises an actuator 27 which is movably mounted and has its contacting end of conducting material. This actuator can be either pivotally mounted or otherwise movably mounted in such a manner as to have a normal zero or open-circuit position from which it can be moved to control the motor as will be explained. In the preferred form of the invention, the actuator is adapted to be connected to a means on the device to be controlled which will move the actuator in either direction from a normal or zero position. A pair of contacts 28 and 29 are positioned to be contacted by the actuator when it is moved in either direction from the off-zero position.

Off-zero movements of the actuator are transmitted to the controlling motor by means of devices which are adapted to load the opposed pairs of shading coils in accordance with the closing of the circuit through either of the contacts 28 or 29 by the actuator 27. In the herein preferred form of the invention, these circuits include electron tubes. By electron tubes is meant any tube in which the flow of electrons in the tube can be controlled. In the present disclosure, however, a three-element thermionic tube is used.

A pair of thermionic tubes 30 and 31, each having a grid 32, filament 33 and plate 34 are included in the system. The grids 32 of the tubes 30 and 31 are connected respectively by wires 37 to the directional contacts 28 and 29, the wires 37 being connected by high resistances 38 and 38a, between which there is a lead 39. The filaments of the two tubes are connected in parallel and to the wires 40 leading to the winding 41 of a transformer 42, the primary 43 of which is connected to the supply wires 15 and 16. The transformer 42 has two other secondary windings 44 and 45 similar to each other and having a common terminal effecting a series plus to minus connection and connecting to the center tap of the filament winding 41 and through wire 46 to an intermediate point 47 of a coupling transformer 48 which couples the shading coils to the thermionic devices. The remaining end of the secondary coil 44 is connected to a resistor 49 which is connected to the actuator 27. The transformer 48 couples the shading coils to the thermionic devices for energization therefrom. The transformer has primary windings 52 and 53 connected respectively to the shading coils 19 and 20. The shading coils have a common return wire 54 leading to the common terminal 55 of the primary windings of the transformer 48. The secondaries 56 of the transformer have a common connection at 47 such that the two remaining ends are either positive, zero or negative polarity at any instant, and these remaining ends are connected individually and respectively to the plates 34 of the thermionic devices 30 and 31.

Voltage is induced in the shading coils 19 and 20, due to the A. C. energization of the field coil 14. This voltage energizes the transformer 48 and induces in the secondaries relatively high A. C. voltages to be impressed on the plates of the thermionic devices 30 and 31. Thus, each plate is alternately positive and negative, and the connections of the secondary coil make the ends of the secondaries 56 of the same polarity and insure that both plates will be positive, zero or negative in polarity at the same time.

As is well known, in thermionic tubes a plate current will flow only when a sufficient positive charge is impressed on the plate. The energization of the two transformers 42 and 48, from the same sixty-cycle supply line and the shading coils, will respectively always have a constant phase relationship, due to the one ultimate source of supply, namely, wires 15 and 16. This relationship is such that when the plates of the devices 30 and 31 are both positively energized, the grids of these devices are negative due to their connection to wire 39 and the negative side of the secondary coil 45 of the transformer 42, all providing no contact is made through the actuator 27 to either of the directional contacts 28 or 29. The magnitude of the negative charge on the grids is such that for this condition of negative grids and positive plates in the thermionic devices 30 and 31, no plate current will flow. If, however, at this point the actuator 27 contacts a directional contact 29, this action will cause the grid connected to that contact to become zero in polarity. This will result because of the following circuit which is established: Resistors 38, 38a and 49 are of like value. When the contact 27 is connected, for instance, to the directional contact 29, resistors 38a and 49 are placed in series across the terminals of the secondary coils 44 and 45. The potential of the grid with respect to the filament is the potential from the common terminal of coils 44 and 45 to the common central connection of the resistors.

Considering absolute potential and starting at the common terminal of the coils 44 and 45, traversing coil 44 results in a rise in E. M. F., traversing the resistance 49 results in a voltage drop which is equal in magnitude and opposite to the E. M. F. in the coil 44. Therefore, a potential of zero exists at the directional contact 29, and, therefore, on the grid 32 of the thermionic device 31. The zero potential also exists at the common terminal of the coils 44—45. When this condition exists, there will be no potential difference between the grid and this latter terminal which connects the center tap of the filament coil. The grid has become less negative in polarity and the current will flow in the associated plate circuit of the thermionic device 31, which, by means of the transformer 48, places a load on the shading coils 10 and causes rotation of the motor in the desired direction so that it will tend to correct the condition which causes the actuator to be moved from zero in a predetermined direction.

In a like manner, if the actuator swings in the other direction contacting the directional contact 28, a similar grid in plate action will take place in the thermionic device 30, loading the shading coils 20 and causing opposite rotation of the motor attached thereto. It will be understood, of course, that during intervals in which the actuator is in zero position and the plates of the thermionic devices are negative and the grids positive, no current will flow in the plate circuit and no motor rotation will result.

Although the above method of the controlling grid polarity has been found exceedingly satisfactory, inasmuch as it produces a quick response in the control motor, which is normally energized, the broader aspects of this invention include any other means by which the balanced fields can be loaded by electron flow which can be controlled by any desired manner. It will be readily apparent that this control circuit can be used in any number of circumstances in which it is desired to automatically compensate for changes from a normal position.

For example, the device to be controlled may be a tank of liquid in which a certain level is to be maintained. The actuator 27 can be controlled by a float and the control shaft 23 can control the valve regulating the flow of fluid into the tank. When the level of the fluid in the tank changes, as, for example, by falling below the constant level, the actuator 27 will move from its zero position and contact one of the directional contacts which will cause the thermionic tubes to load the proper feed coil and cause the motor to rotate in the desired direction, to open the valve and permit more liquid to flow into the tank. As soon as the fluid in the tank reaches the normal level again, the actuator 27 will be moved from the contact and the motor will stop immediately, due to the action of the fields, and the valve returns to normal.

This is but one example of a use for the device as it can also be used to control temperatures in furnaces, houses, and used to control tension of material, and, in fact many other devices in which a definite normal condition is desired to be maintained.

In another form of the invention shown in Fig. 2, the control motor is the same as described in the previous form. However, the mode of controlling the motor is different inasmuch as a single electron tube is used and is adapted to be coupled to each of the pairs of wire-wound shading coils by means of a switch operating in timed relation with the directional contacts, as will be described.

In this form of the invention, the control comprises an actuator 64 which is pivotally mounted for vertical movement, as well as horizontal movement. The actuator is adapted to cooperate with a pair of contacts 65 and 66 mounted on a drum 67 of insulating material on opposite sides thereof, as shown in Fig. 2, so that they are constantly 180° out of phase. The drum is connected to a synchronous motor 68, connected across the wires 15 and 16 of the source of alternating current supply, by means of suitable gearing 69. In order to prevent undue wear on the drum, the actuator is maintained out of surface contact with the drum, but is periodically pressed into contact with the drum by means of a bail 70 mounted on a shaft and actuated by an arm 71 which contacts a double wing cam 72. The bail, through the operation of the double wing cam, will depress the actuator into contact with the drum twice in each rotation of the drum. The cam is so positioned on the shaft that the actuator will be pressed into contact with the drum at the time when the contacts 65 and 66 are in a position to be engaged thereby.

The shading coils controlling the motor have a common terminal 73 connected to the primary 74 of a coupling transformer 75. The other end of the primary is connected by a wire 76 to the blade 77 of a single-pole double-throw switch. The switch is provided with a pair of contacts 78 and 79 which are so positioned as to be contacted by the blade in its movement to either extreme position. The contact 78 is connected to shading coil 20 by a wire 80, and contact 79 is connected by a wire 81 to the shading coil 10 so that either shading coil can be connected in the circuit of the coupling transformer.

The blade 77, which may be actuated in any desired manner, is provided at its upper end with a strip of insulation 77a. In the preferred form of the invention, the blade is normally biased into contact with the contact 78, and is periodically moved to close either the circuit through the contact 78 or 79 by means of a cam 82 secured on the drum shaft. The cam 82 is mounted on the shaft in a definite position with respect to the contacts on the drum so that the proper shading coil will be associated with the transformer 75 when the corresponding directional contact is in position to be engaged by the actuator.

In this form of the invention, a single electron tube is used to load either pair of shading coils so that the motor will be rotated in the desired direction. As in the other form of the invention, any type of tube, in which electron flow can be controlled, may be used. In the herein disclosed form of the invention, a three-element thermionic device 84 is used, the device having a grid 85, filament 86 and plate 87.

The directional contacts 65 and 66 are connected to end plates 89 and 90 on the drum, and a pair of brushes 91 and 92 are positioned to engage the contacts during rotation of the drum. These brushes are connected by a common wire 93 to the grid 85. The filament 86 of the thermionic device 84 is connected by wires 101 to the filament coil 102 of a transformer 97.

The actuator is connected by a wire 94 through a grid resistor 95 to a secondary or grid coil 96 of the transformer 97, the primary winding 98 of the transformer being disposed across the lines 15 and 16. The coil 96 has a center tap connected by a wire 104 with the center tap of the filament coil 102 and the remaining end of the coil 96 is connected by a wire 99 through a grid resistor 100 to the wire 93 leading to the grid of the thermionic tube. A wire 104 is connected to one end of the secondary 105 of the transformer 75. The other end of the secondary 105 is connected by a wire 106 to the plate 87 of the tube 84.

It will be seen that when the actuator is not engaging either contact of the drum, the grid of the tube 84 will have impressed on it an alternating voltage from the coil 96 through the resistor 100.

According to this form of the invention, this voltage is synchronized with an alternating voltage applied to the plate but is in phase opposition to said voltage. This is accomplished by having the field coil 14 of the motor connected to the supply wires 15, 16 in such a manner that the induced voltages of either set of shading coils of the motor will, when the single-pole double-throw switch is in closed position, energize the transformer 75 so that the secondary coil 105 thereof impresses the desired voltage of opposite polarity to that of the grid on a plate 87 of the tube 84.

When the controller is in a zero position, no current will flow in the plate circuit of the thermionic device 84, since, during intervals that the plate of said device is positive, the negative bias on the grid is sufficient to keep the plate current substantially zero, and during intervals that the grid is positive due to alternating of the supply voltage the plate will be negative so that no plate current can flow for this condition. Since no plate current can flow when the actuator is in zero position, the motor 11 will remain stationary.

However, should the actuator move in either one direction or the other, it will, when depressed periodically by the bail 70, connect one or the other of the contacts 65 or 66 through the resistor 95. The resistor 95 is preferably of equal value to that of resistor 100 so that, as a consequence of the contact caused by the actuator, the voltage on the grid of the tube 84 will be reduced to substantially zero and during intervals of positive polarity of the plate, a current will flow in the plate circuit and load, as determined by the position of the single-pole double-throw switch, a set of shading coils so as to cause the motor to rotate in the desired direction. Thus, movement of the actuator can, depending on the position of the switch, load either set of shading coils to cause rotation of the motor in either direction.

As shown in Fig. 2, the single-pole double-throw switch is actuated automatically with the rotation of the drum 67 so as to associate with the thermionic device the proper set of shading coils when the directional contact for rotating the control motor in the desired direction is in a position to be engaged by the actuator should it be deflected in that direction from zero position.

Preferably, the cam 82 and switch are so arranged that the latter closes a shading coil circuit before contact can be established to either of the contacts 65 or 66 and opens the shading coil circuit after this engagement with either of the drum contacts is broken. Thus, there will be positively no arcing at the contacts of this switch since contact is made and broken during the periods when current of the shading coils is extremely low, as no plate current can flow unless either of the drum contacts is engaged by the actuator.

The motor 68, which is connected across the supply lines 15 and 16, is preferably of a type having a speed such that it will turn sufficiently slowly relative to the frequency of the A. C. energization of the system that several alternations of current will take place during a period of contact between the actuator 64 on either of the contacts 65 or 66 when the actuator is out of zero position.

With this construction, it will be seen that one of the electron tubes can be dispensed with and the single remaining tube can be coupled to the shading coils of the motor selectively and in definite timed relation with the presentation of the contacts for cooperation with the actuator when the latter deflects in either direction in order to produce the desired rotation of the motor. As soon as the condition to be corrected returns to normal and the actuator returns to zero position, the bias on the grid becomes negative again and the plate current stops so that the shading coils are no longer loaded. The balanced fields will immediately stop rotation of the rotor and prevent the mechanism being controlled from overrunning and hunting.

From the foregoing, it will be seen that I have produced a controlling mechanism which is accurate and efficient in operation and which will correct any changes without overrunning or hunting.

Variations and modifications may be made within the scope of this invention and portions of the improvements may be used without others.

I claim:

1. In a control apparatus, an alternating current motor operative in reverse directions; control circuits for controlling the direction of operation of said motor; a movable actuator; switch means including contacts rendered operable by the actuator and connected in said control circuit for periodically closing and opening a circuit according to a given constant period when said actuator moves in one direction and for periodically closing and opening the circuit according to a similar period when the actuator moves in the other direction, said periods being in constant phase opposition and in predetermined relation with the voltage impressed on said motor; and circuit-control means connected with said switch means and control circuits and automatically operated in synchronism with the periods of opening and closing of the switch means for connecting the motor means for alternate forward and reverse operation so that movement of the actuator in one direction operates the motor in one direction and movement of the actuator in the other direction operates the motor in the reverse direction.

2. In a control apparatus, a reversible motor; control circuits for controlling the operation of said motor; an electron tube system connected with said control circuits for causing operation of the motor; a movable actuator; means, including contacts, engageable by the movable actuator for controlling the functioning of the electron tube system in response to movement of the actuator; and circuit-control means connected in said control circuits and automatically operative in timed relation with the last-mentioned means for causing the electron tube system to operate the motor in one direction or the other, depending on the direction of movement of the actuator.

3. In a control apparatus, an alternating current motor having a continuously energized A. C. field and a pair of oppositely disposed wire-wound pole-shading coils; a control circuit for controlling the direction of operation of said motor; an electron discharge device; means connecting said device with the control circuits for operation of the motor by the device; a movable actuator; means, including contacts, cooperable with the actuator and operable in response to movement of said actuator controlling the functioning of the electron discharge device; and circuit-control means connected in said control circuit and automatically operative in timed relation with the last-mentioned means for causing the electron discharge device to be alternately connected to one of the sets of shading coils to operate the motor in one direction or the other, depending on the direction of movement of the actuator.

4. In a control apparatus, a reversible A. C. motor having a continuously excited field and oppositely disposed wire-wound shading coils; an actuating member having a normal zero position and movable to either side of the zero position in accordance with the magnitude of a condition; a thermionic device; a circuit controlled by the off-zero movements of the actuator and connected with the grid of the thermionic device, including means for polarizing said grid; means coupling the wire-wound shading coils of the motor to the plate of the thermionic device, said means including a transformer whereby voltages induced in the shading coils are impressed on said plate; means connected with the shading coils for selectively connecting the coils to the transformer; means connected to the actuator for causing the grid of the thermionic device to become depolarized to cause current to flow in the plate circuit and make operative the shading coil energizing said circuit to cause rotation of the motor; and means for automatically operating the shading coil connecting means concurrently with the grid-depolarizing means connected to the movable member.

5. In a control apparatus, a reversible A. C. motor having a continuously excited field and a pair of oppositely disposed wire-wound shading coils; an electron discharge device for operating the motor; means for connecting the shading coils of the motor with the discharge device including automatic switch means for alternately connecting each coil; a movable actuator; and means for causing periodic functioning of the discharge device to periodically drive the motor in response to the movement of the actuator, periods of functioning due to the movement in one direction corresponding to the periods of connection of one shading coil and the periods of functioning due to the movement in another direction corresponding to the periods of connection in the other shading coil.

6. In a control system, means to be driven; means connected to said means, including a reversible A. C. motor having a continuously excited field and oppositely disposed wire-wound shading coils; an electron discharge device; means for coupling the electron discharge device to the shading coils of the motor; automatic switch means in the circuit for the shading coils for alternately connecting each coil; a movable actuator; and means for causing periodic function of the discharge device in response to movement of the actuator, the periods of functioning due to movement in one direction corresponding to the periods of connection of one shading coil and the periods of functioning due to the movement in the other direction corresponding to the periods of connection of the other shading coil.

7. In a control system, a reversible A. C. motor having a continuously excited field and a pair of oppositely disposed wire-wound shading coils; an electron discharge device for operating the motor; means for coupling the shading coils of the motor with the discharge device; a movable actuator; means for causing periodic functioning according to a constant frequency of the discharge device in response to movement of the actuator in one direction and for causing a similar periodic function of the discharge device in response to movement of the actuator in the other direction, the periods of the latter functioning being in phase opposition with the first-mentioned periods; and means connected with the shading coils for alternately connecting the coils to said coupling means in step with the periods of functioning of the discharge device.

8. In a control apparatus, an electro-responsive means operative in reverse directions; a movable actuating member; an electrical system for operating said responsive means in one direction or the other in response to movement of the member in one direction or the other respectively, said system including means engageable by the movable actuating member for causing intermittent operation according to a given constant period of electro-responsive means upon movement of the member in one direction and for causing similar intermittent operation of the electro-responsive means upon movement of the member in the other direction, the periods of said intermittent operation being substantially in phase opposition; continually operative direction-selecting means connected with the electro-responsive means for continuously reversing the direction in which the electro-responsive means is operative, said selecting means operating in synchronism with the periodicity of the intermittent operations of the electro-responsive means resulting from movement of the actuator in either direction; and circuits for coupling said means actuated by the movable member with the selecting means.

9. In a control system, a reversible A. C. motor having a continuously excited field and oppositely disposed wire-wound shading coils; an electron tube device; means for coupling the electron tube device to the shading coils of the motor to be energized therefrom; automatic switch means in the circuit for the shading coils for alternately connecting each coil; a movable actuator; and means for causing periodic functioning of the tube device in response to movement of the actuator, the periods of functioning, due to the movement of the actuator in one direction corresponding to the periods of connection of one shading coil and the periods of functioning due to movement of the actuator in the other direction corresponding to periods of connection with the other shading coil.

10. In a control apparatus, an electro-responsive means operative in reverse directions; control circuits, for controlling the direction of operation of said means; a deflectable member; switch means actuated by the deflectable member, and connected in said control circuits, for periodically closing and opening a circuit according to a given constant period when the said member deflects in one direction, and for periodically closing and opening the circuit according to a similar period when the member deflects in the other direction, said periods being in constant phase opposition; and means connected with said switch means and control circuits, and automatically actuated in synchronism with the periods of opening and closing of the switch means, for causing the electro-responsive means to operate in one direction when the deflectable member deflects in one direction, and for causing the electro-responsive means to operate in the reverse direction when the member deflects in the other direction, in which the switch means includes a contact directionally movable by the deflectable member, a pair of contacts for engagement with the first contact, and means for periodically alternately bringing the contacts of said pair into the field of action of the directionally movable contact.

11. In a control apparatus, an electro-responsive means operative in reverse directions; control circuits, for controlling the direction of operation of said means; a deflectable member; switch means actuated by the deflectable member, and connected in said control circuits for periodically closing and opening a circuit according to a given constant period when the said member deflects in one direction, and for periodically closing and opening the circuit according to a similar period when the member deflects in the other direction, said periods being in constant phase opposition; and circuit control means connected with said switch means and control circuits, and automatically operated in synchronism with the periods of opening and closing of the switch means, for connecting the electro-responsive means for alternating forward and reverse operation so that deflection of the deflectable member in one direction operates the electro-responsive means in one direction, and deflection of the member in the other direction operates the electro-responsive means in the reverse direction, in which the switch means includes a contact directionally movable by the deflectable member, a pair of contacts for engagement with the first contact, and includes means for periodically alternately bringing the contacts of said pair into the field of action of the directionally movable contact, and in which the circuit control means includes a single pole double throw switch.

12. In a control device, a reversible motor; a switch in the circuit of the motor for reversing the same; a relay for closing the circuit to the motor; a deflectable member; a drum having contacts in the relay circuit angularly displaced on its surface to engage the deflectable member in the deflected position; means for periodically moving the deflecting member so that it may close the circuit to the relay; and means for rotating the drum and operating the switch in timed relation to thereby control the direction of rotation of the motor in accordance with the position of the deflectable member.

13. In a control apparatus, a reversible A. C. motor having a continuously excited field and a pair of oppositely disposed wire wound shading coils; a relay and selector switch connected in the circuit with the shading coils; a deflectable member; a drum having contacts in the relay circuit angularly spaced on its surface to engage the deflectable member in deflected position; means for periodically moving the deflecting member so that it may close the circuit to the relay; and means for rotating the drum and operating the switch in timed relation to thereby control the direction of rotation of the motor in accordance with the position of the deflectable member.

14. In a control apparatus, an electro-responsive means operative in reverse directions; control circuits for controlling the direction of operation of said means; an electron discharge system connected with said control circuits for causing operation of the electro-responsive means; a deflectable member; means including normally open switch contacts cooperative with the deflecting member for controlling the functioning of the electron discharge system in response to deflection of said deflectable member; means for closing the switch contacts periodically during deflection of the deflectable member in either direction; and circuit control means connected in said control circuits and automatically operative in timed relation with said last-named means for causing the electron discharge system to operate the electro-responsive means in one direction or the other, depending upon the direction of deflection of the deflectable member.

15. In a control apparatus, an electro-responsive means operative in reverse directions; control circuits for controlling the direction of operation of said means; an electron discharge system connected with said control circuits for causing operation of the electro-responsive means; a deflectable member; means including a normally open switch in operative relation with the deflectable member for controlling the function of the electron discharge system in response to deflection of the deflectable member; means for closing the switch periodically during deflection of the deflectable member in either direction so that periods of closing during deflection in one direction, if continued during the periods of closing for deflection in the opposite direction, would alternate with said latter periods of closing; and circuit control means connected in said control circuits and automatically operative in timed relation with said last-mentioned means for causing the electron discharge system to operate the electro-responsive means in one direction or the other, depending upon the direction of deflection of the deflectable member.

MANFRED J. JOHNSON.